United States Patent
Noguchi et al.

(10) Patent No.: US 10,408,102 B2
(45) Date of Patent: Sep. 10, 2019

(54) OXIDATION CATALYST DEVICE FOR EXHAUST GAS PURIFICATION

(71) Applicants: CATALER CORPORATION, Kakegawa-shi, Shizuoka (JP); TOYOTA JIDOSHA KABUSHIKI KAISHA, Toyota-shi, Aichi-ken (JP)

(72) Inventors: Takahiro Noguchi, Kakegawa (JP); Makoto Tsuji, Kakegawa (JP); Hiroto Imai, Kakegawa (JP); Yusuke Shimmyo, Toyota (JP); Hiroyuki Matsubara, Toyota (JP)

(73) Assignees: CATALER CORPORATION, Kakegawa-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/995,163

(22) Filed: Jun. 1, 2018

(65) Prior Publication Data

US 2019/0093530 A1 Mar. 28, 2019

(30) Foreign Application Priority Data

Sep. 25, 2017 (JP) ................................ 2017-183643

(51) Int. Cl.
| | |
|---|---|
| *B01J 21/04* | (2006.01) |
| *F01N 3/10* | (2006.01) |
| *F01N 3/28* | (2006.01) |
| *B01J 37/02* | (2006.01) |
| *B01J 21/08* | (2006.01) |
| *B01J 23/63* | (2006.01) |
| *B01J 21/06* | (2006.01) |
| *F01N 3/20* | (2006.01) |

(52) U.S. Cl.
CPC .............. *F01N 3/101* (2013.01); *B01J 21/04* (2013.01); *B01J 21/066* (2013.01); *B01J 21/08* (2013.01); *B01J 23/63* (2013.01); *B01J 37/0244* (2013.01); *B01J 37/0248* (2013.01); *F01N 3/103* (2013.01); *F01N 3/2803* (2013.01); *F01N 3/2828* (2013.01); *F01N 3/2066* (2013.01); *F01N 2510/06* (2013.01); *F01N 2510/0682* (2013.01); *F01N 2510/0684* (2013.01)

(58) Field of Classification Search
CPC . B01J 21/04; B01J 21/066; B01J 21/08; B01J 23/63; B01J 37/0244; B01J 37/0248; F01N 3/101; F01N 3/103
USPC ........................................................ 502/304
See application file for complete search history.

(56) References Cited

FOREIGN PATENT DOCUMENTS

| | | |
|---|---|---|
| JP | 2015-508468 A | 3/2015 |
| JP | 5959530 B2 | 8/2016 |
| JP | 2017-501032 A | 1/2017 |
| WO | 2012/079598 A1 | 6/2012 |
| WO | 2013/088152 A1 | 6/2013 |
| WO | 2015/095058 A1 | 6/2015 |

*Primary Examiner* — Edward M Johnson
(74) *Attorney, Agent, or Firm* — Oliff PLC

(57) ABSTRACT

An oxidation catalyst device for exhaust gas purification, having a first catalyst coating layer on the exhaust gas flow's upstream side, second catalyst coating layer of an upper layer on exhaust gas flow's downstream side, and third catalyst coating layer of a lower layer on exhaust gas flow's downstream side, on a substrate, wherein the weight ratio of platinum to palladium in the first catalyst coating layer is 0.75 to 4.50, weight ratio of platinum to palladium in second catalyst coating layer is greater than 4.50 to 25.0, weight ratio of platinum to palladium in third catalyst coating layer is 0.12 or less, the length of first catalyst coating layer is 8% to 55% of the substrate's length, length of second catalyst coating layer is 45% to 95% of the substrate's length, and length of third catalyst coating layer is 45% to 95% of the substrate's length.

9 Claims, 4 Drawing Sheets

EXAMPLES 1 TO 6, COMPARATIVE EXAMPLES 1 TO 7

COMPARATIVE EXAMPLES 8 and 9

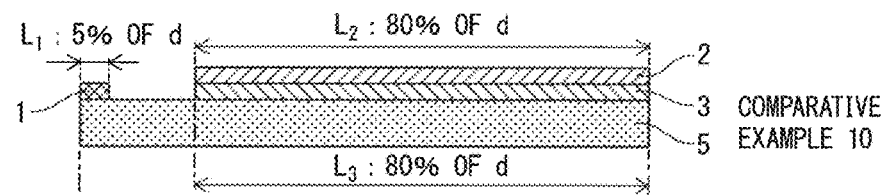
FIG. 3(a) COMPARATIVE EXAMPLE 10
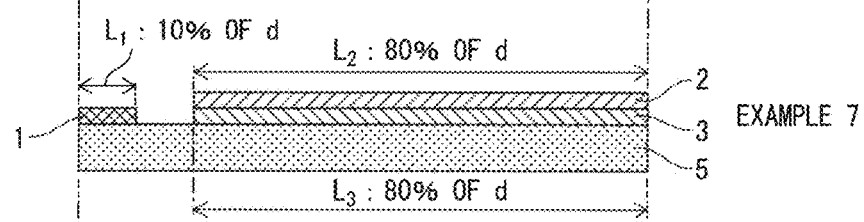
FIG. 3(b) EXAMPLE 7
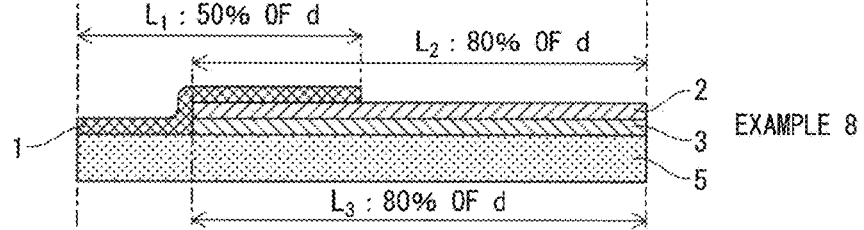
FIG. 3(c) EXAMPLE 8
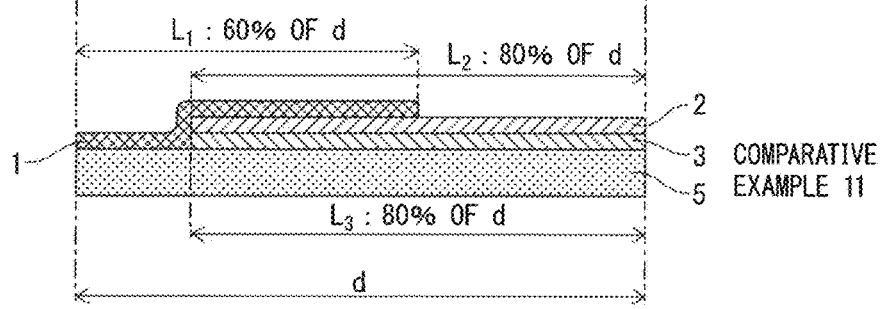
FIG. 3(d) COMPARATIVE EXAMPLE 11

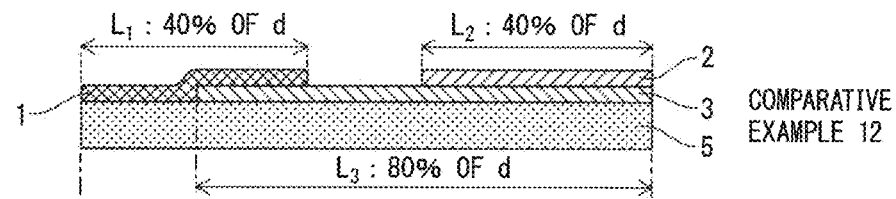
FIG. 4 (a) COMPARATIVE EXAMPLE 12
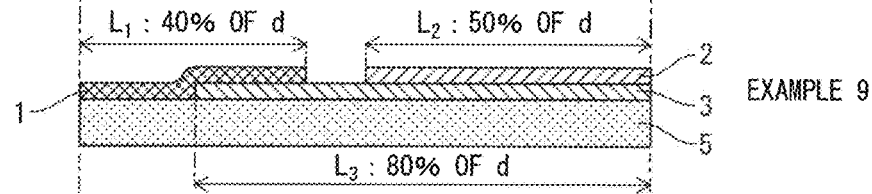
FIG. 4 (b) EXAMPLE 9
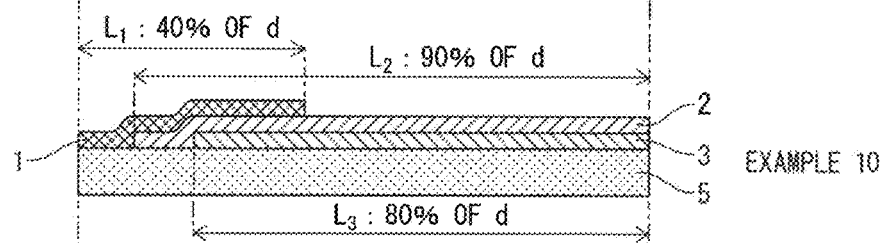
FIG. 4 (c) EXAMPLE 10
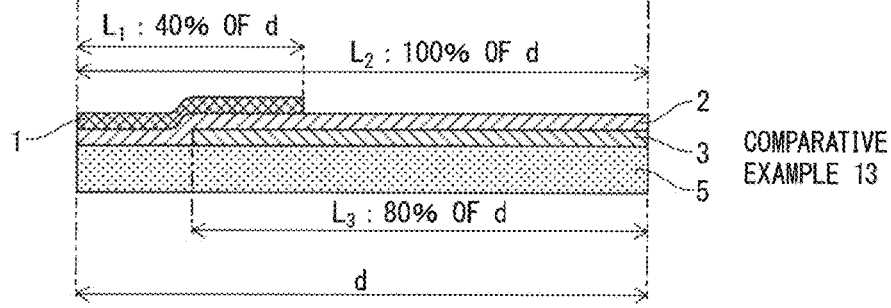
FIG. 4 (d) COMPARATIVE EXAMPLE 13

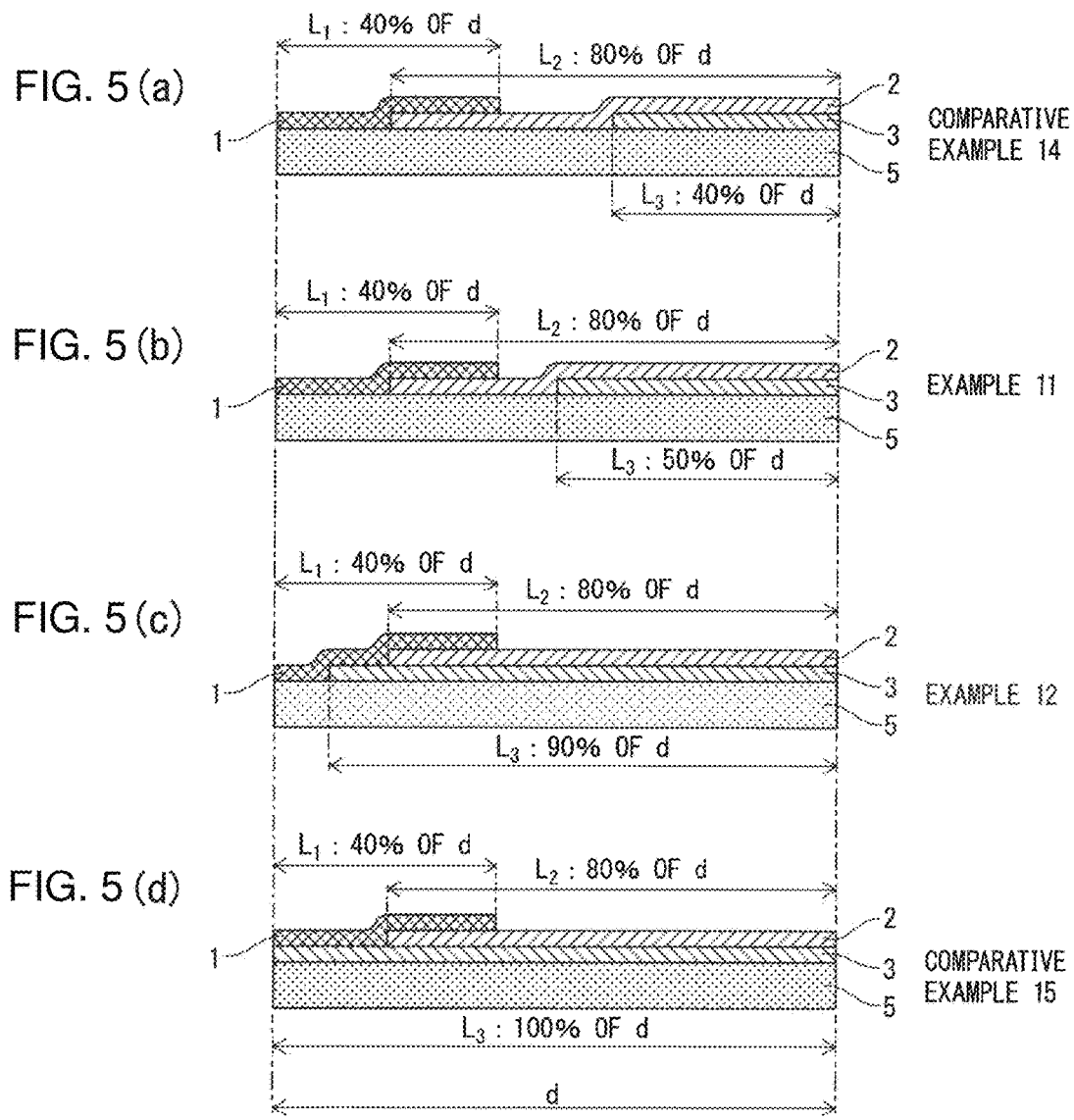

OXIDATION CATALYST DEVICE FOR EXHAUST GAS PURIFICATION

FIELD

The present invention relates to an oxidation catalyst device for exhaust gas purification.

BACKGROUND

Exhaust gas emitted from automobile and other internal combustion engines contains components such as hydrocarbons (HC), carbon monoxide (CO) and nitrogen oxides ($NO_X$). Various types of catalyst technologies have been examined in order to purify these components.

A known example of a catalyst system for purifying exhaust gas emitted from diesel engines is a catalyst system that combines a diesel oxidation catalyst (DOC) device and a selective catalytic reduction (SCR) device. In this catalyst system, HC are purified by being oxidized to water ($H_2O$) and carbon dioxide ($CO_2$) by the DOC and CO is purified by being oxidized to carbon dioxide ($CO_2$) by the DOC, while $NO_X$ (consisting mainly of nitrogen oxide (NO) and nitrogen dioxide ($NO_2$)) are purified by being reduced to nitrogen ($N_2$) using a reducing agent such as urea by the SCR after a portion of the NO is first oxidized to $NO_2$ by the DOC. In this SCR, the rate of the $NO_X$ reduction reaction is known to be fast when there are equimolar amounts of NO and $NO_2$.

Various studies have been conducted on the DOC used in this catalyst system in attempt to improve the oxidation efficiency of HC, CO and NO.

For example, the device for purifying diesel exhaust gas described in PTL 1 is provided with a zoned arrangement of catalysts having a first oxidation catalyst arranged on a support substrate as a front catalyst, and a second oxidation catalyst as a rear catalyst immediately thereafter arranged on this support substrate, in the direction of exhaust gas flow. The support base is a flow-through substrate, and the first and second oxidation catalysts contain palladium and platinum in the catalytically active coating thereof. The total amounts of platinum and palladium in the front catalyst are 30 $g/ft^3$ to 250 $g/ft^3$, respectively, which are higher than those of the rear catalyst of 5 $g/ft^3$ to 100 $g/ft^3$, and the Pt:Pd ratio in the front catalyst is lower than that of the rear catalyst.

PTL 2 describes an oxidation catalyst composite material for reducing exhaust gas emissions from lean-burning engines, which contains a support substrate having a length, an inlet end and an outlet end, and a catalyst material of an oxidation catalyst on this support; wherein, the catalyst material of the oxidation catalyst comprises a first washcoat containing zeolite, Pt and a first refractory Mn-containing metal oxide support, a second washcoat containing a second refractory metal oxide support and a platinum (Pt) component and palladium (Pd) component having a Pt:Pd ratio within the range of about 10:1 to 1:10, and a third washcoat containing palladium and a rare earth oxide component, but not substantially not containing platinum, and is effective for reducing hydrocarbons and carbon monoxide present in the exhaust gas of lean-burning engines and for oxidizing NO to $NO_2$. It is explained in this PTL 2 that an arbitrary arrangement can be used for the arrangement of the first to third washcoats on the support substrate.

CITATION LIST

Patent Literature

[PTL 1] Japanese Patent No. 5959530
[PTL 2] Japanese Translation of PCT Application No. 2017-501032

SUMMARY

Technical Problem

An object of the present invention is to provide a catalyst device for exhaust gas purification that demonstrates sufficiently high oxidation efficiency with respect to all of HC, CO and NO.

Solution to Problem

The present invention is as indicated below.

(1) An oxidation catalyst device for exhaust gas purification having a substrate and first to third catalyst coating layers on the substrate; wherein,
the first catalyst coating layer is present on the upstream side of exhaust gas flow, the second catalyst coating layer is present in an upper layer on the downstream side of exhaust gas flow, and the third catalyst coating layer is present in a lower layer on the downstream side of exhaust gas flow,
the first catalyst coating layer contains platinum and palladium, and the ratio ($W_{Pt1}/W_{Pd1}$) of the weight of the platinum ($W_{Pt1}$) to the weight of the palladium ($W_{Pd1}$) is 0.75 to 4.50,
the second catalyst coating layer contains platinum and palladium, and the ratio ($W_{Pt2}/W_{Pd2}$) of the weight of the platinum ($W_{Pt2}$) to the weight of the palladium ($W_{Pd2}$) is greater than 4.50 to 25.0,
the third catalyst coating layer at least contains palladium, and the ratio ($W_{Pt3}/W_{Pd3}$) of the weight of the platinum ($W_{Pt3}$) to the weight of the palladium ($W_{Pd3}$) is 0.12 or less,
the length of the first catalyst coating layer is 8% to 55% of the length of the substrate,
the length of the second catalyst coating layer is 45% to 95% the length of the substrate, and
the length of the third catalyst coating layer is 45% to 95% of the length of the substrate.

(2) The oxidation catalyst device for exhaust gas purification described in (1) above, wherein the substrate is covered by at least one of the first to third catalyst coating layers over the entire length thereof.

(3) The oxidation catalyst device for exhaust gas purification described in (1) or (2) above, having a layered region in which the first catalyst coating layer and at least one of the second catalyst coating layer and the third catalyst coating layer are layered, and the first catalyst coating layer is the upper layer in the layered region.

(4) The oxidation catalyst device for exhaust gas purification described in any of (1) to (3) above, wherein the length of the first catalyst coating layer is 10% to 50% of the length of the substrate,
the length of the second catalyst coating layer is 50% to 90% of the length of the substrate, and
the length of the third catalyst coating is 50% to 90% of the length of the substrate.

(5) The oxidation catalyst device for exhaust gas purification described in any of (1) to (4) above, wherein the ratio ($W_{Pt1}/W_{Pd1}$) of the weight of the platinum ($W_{Pt1}$) to the weight of palladium ($W_{Pd1}$) in the first catalyst coating layer is 1.00 to 4.00,
the ratio ($W_{Pt2}/W_{Pd2}$) of the weight of the platinum ($W_{Pt2}$) to the weight of palladium ($W_{Pd2}$) in the second catalyst coating layer is 5.00 to 20.0, and the ratio ($W_{Pt3}/W_{Pd3}$) of the weight of the platinum ($W_{Pt3}$) to the weight of palladium ($W_{Pd3}$) in the third catalyst coating layer is 0.10 or less.

(6) The oxidation catalyst device for exhaust gas purification described in any of (1) to (5) above, wherein the total of the weight of the platinum and the weight of the palladium in the first catalyst coating layer is greater than the total of the weight of the platinum and the weight of the palladium in the second catalyst coating layer and the third catalyst coating layer.

(7) The oxidation catalyst device for exhaust gas purification described in any of (1) to (6) above, wherein the platinum and palladium in the first to third catalyst coating layers are supported on particles of one or more types of oxides selected from oxides of Al, Si, Ce and Zr.

(8) The oxidation catalyst device for exhaust gas purification described in any of (1) to (7) above, wherein the first to third catalyst coating layers contain particles of one or more types of oxides selected from Al, Si, Ce and Zr oxides on which platinum and palladium are not supported.

(9) A catalyst system for exhaust gas purification, including the oxidation catalyst device for exhaust gas purification described in any of (1) to (8) above, and a selective catalytic reduction device for exhaust gas purification on the downstream side of exhaust gas flow thereof.

Advantageous Effects of Invention

According to the present invention, an oxidation catalyst device for exhaust gas purification is provided that demonstrates sufficiently high oxidation efficiency with respect to HC, CO and NO.

BRIEF DESCRIPTION OF DRAWINGS

FIG. 2(a) is a schematic cross-sectional diagram showing the configuration of a catalyst device produced in Examples 1 to 6 and Comparative Examples 1 to 7, while FIG. 2(b) is a schematic cross-sectional diagram showing the configuration of a catalyst device produced in Comparative Examples 8 and 9.

FIGS. 3(a) to 3(d) are schematic cross-sectional diagrams showing the configurations of catalyst devices respectively produced in Comparative Example 10, Example 7, Example 8 and Comparative Example 11.

FIGS. 4(a) to 4(d) are schematic cross-sectional diagrams showing the configurations of catalyst devices respectively produced in Comparative Example 12, Example 9, Example 10 and Comparative Example 13.

FIGS. 5(a) to 5(d) are schematic cross-sectional diagrams showing the configurations of catalyst devices respectively produced in Comparative Example 14, Example 11, Example 12 and Comparative Example 15.

DESCRIPTION OF EMBODIMENTS

<<Catalyst Device for Exhaust Gas Purification>>

The catalyst device for exhaust gas purification of the present invention is an oxidation catalyst device for exhaust gas purification having a substrate and first to third catalyst coating layers on this substrate, wherein the first catalyst coating layer is present on the upstream side of exhaust gas flow, the second catalyst coating layer is present in an upper layer on the downstream side of exhaust gas flow, and the third catalyst coating layer is present in a lower layer on the downstream side of exhaust gas flow, the first catalyst coating layer contains platinum and palladium, and the ratio ($W_{Pt1}/W_{Pd1}$) of the weight of the platinum ($W_{Pt1}$) to the weight of the palladium ($W_{Pd1}$) is 0.75 to 4.50, the second catalyst coating layer contains platinum and palladium, and the ratio ($W_{Pt2}/W_{Pd2}$) of the weight of the platinum ($W_{Pt2}$) to the weight of the palladium ($W_{Pd2}$) is greater than 4.50 to 25.0, the third catalyst coating layer at least contains palladium, and the ratio ($W_{Pt3}/W_{Pd3}$) of the weight of the platinum ($W_{Pt3}$) to the weight of the palladium ($W_{Pd3}$) is 0.12 or less, the length of the first catalyst coating layer is 8% to 55% of the length of the substrate, the length of the second catalyst coating layer is 45% to 95% the length of the substrate, and the length of the third catalyst coating layer is 45% to 95% of the length of the substrate.

The length of the first to third catalyst coating layers refers to the length in the direction of exhaust gas flow.

The inventors of the present invention conducted studies in an attempt to achieve the object of the present invention. As a result, it was found that, in an oxidation catalyst device for gas exhaust gas purification containing platinum (Pt) and palladium (Pd) as precious metals, a preferable range of the weight ratio of platinum to palladium separately exists for each of oxidation of HC, oxidation of CO and oxidation of NO, and that it is difficult to obtain sufficiently high oxidation efficiency for all of HC, CO and NO simply by adjusting the weight ratio of platinum to palladium in a single catalyst coating layer. Pd is also known to be poisoned by HC present in exhaust gas.

The present invention was completed based on the aforementioned findings.

Figure 1:
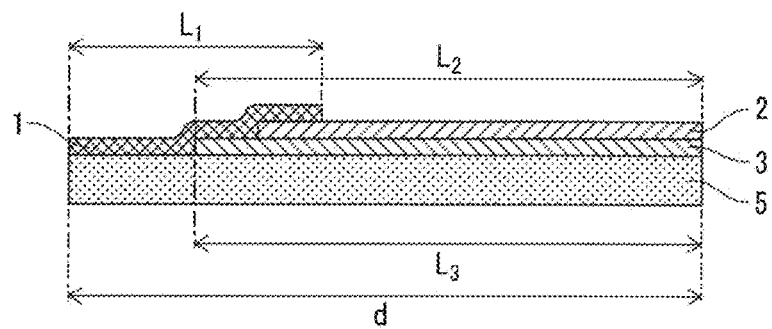
FIG. 1 is a schematic cross-sectional diagram showing an example of the oxidation catalyst device for exhaust gas purification of the present invention.

FIG. 1 shows a schematic cross-sectional diagram of an example of the configuration of an oxidation catalyst device for exhaust gas purification of the present invention.

The catalyst device for exhaust gas purification of FIG. 1 has a substrate (5) and a first catalyst coating layer (1), a second catalyst coating layer (2) and a third catalyst coating layer (3) on the substrate (5). The first catalyst coating layer (1) is arranged on the upstream side of exhaust gas flow and mainly contributes to the HC oxidation reaction. The second catalyst coating layer (2) is arranged in an upper layer on the downstream side of exhaust gas flow and mainly contributes to the NO oxidation reaction. The third catalyst coating layer (3) is arranged in a lower layer on the downstream side of exhaust gas flow and mainly contributes to the CO oxidation reaction.

The first catalyst coating layer (1) contains platinum and palladium. In the first catalyst coating layer (1), the ratio ($W_{Pt1}/W_{Pd1}$) of the weight of platinum ($W_{Pt1}$) to the weight of palladium ($W_{Pd1}$) is adjusted to be within a range suitable for the HC oxidation reaction. As a result, the first catalyst coating layer (1) demonstrates a high level of activity in the HC oxidation reaction.

The length ($L_1$) of the first catalyst coating layer (1) is long enough to ensure that HC present in exhaust gas that has flowed into the catalyst device is sufficiently oxidized on the first catalyst coating layer (1) and short enough to ensure that the precious metal concentration in the first catalyst coating layer (1) is maintained at a high level and that the first catalyst coating layer can be "ignited". "Ignition" of the first catalyst coating layer refers to the temperature of the first catalyst coating layer (1) being made sufficiently high by generation of heat by oxidation of HC, and the HC oxidation reaction being further promoted by the catalytic action of the first catalyst coating layer.

The first catalyst coating layer (1) is arranged on the upstream side of exhaust gas flow. As a result, exhaust gas that has flowed into the catalyst device for exhaust gas purification first contacts the first catalyst coating layer (1) having a high level of activity in the HC oxidation reaction, and after HC have been efficiently removed, contacts the second catalyst coating layer (2) and the third catalyst coating layer (3) on the downstream side of exhaust gas flow. Thus, in the oxidation catalyst device for exhaust gas purification of the present invention, the degree of HC poisoning of palladium in the second catalyst coating layer (2) and the third catalyst coating layer (3) is reduced.

The second catalyst coating layer (2) contains platinum and palladium. Activity of the NO oxidation reaction improves when the proportion of platinum in the catalyst coating layer is high and only a small amount of palladium is present. The catalyst coating layer also demonstrates superior heat resistance when a small amount of palladium is contained therein together with platinum. From this viewpoint, in the second catalyst coating layer (2) of the oxidation catalyst device for exhaust gas purification of the present invention, the ratio ($W_{Pt2}/W_{Pd2}$) of the weight of platinum ($W_{Pt2}$) to the weight of palladium ($W_{Pd2}$) is adjusted to the optimum range that realizes both high levels of activity of the NO oxidation reaction and heat resistance of the second catalyst coating layer. As a result, the second catalyst coating layer (2) demonstrates a high level of activity in the NO oxidation reaction.

The length ($L_2$) of the second catalyst coating layer (2) is long enough to ensure that NO present in exhaust gas is sufficiently oxidized on the second catalyst coating layer (2). Thus, NO present in exhaust gas that has passed the first catalyst coating layer (1) can be oxidized to $NO_2$ with high efficiency. On the other hand, the length ($L_2$) of the second catalyst coating layer (2) is short enough to prevent contact with gas having a high HC concentration prior to being purified by the first catalyst coating layer (1). Namely, the second catalyst coating layer (2) is arranged on the downstream side of exhaust gas flow over a length that is shorter than a length (d) of the substrate (5). Thus, exhaust gas that has flowed into the catalyst device contacts the second catalyst coating layer (2) after HC have been efficiently removed by the first catalyst coating layer (1). Consequently, Pd present in the second catalyst coating layer (2) is inhibited from being poisoned by HC and the NO oxidation reaction is able to proceed with the intended high efficiency.

The second catalyst coating layer (2) is arranged in an upper layer on the downstream side of exhaust gas flow. As a result, after having passed the first catalyst coating layer (1), exhaust gas is able to immediately contact the second catalyst coating layer (2), thereby enabling NO present in the exhaust gas to be rapidly subjected to an oxidation reaction by the second catalyst coating layer (2).

The third catalyst coating layer (3) at least contains palladium. In general, the CO oxidation reaction improves when the proportion of palladium in the catalyst coating layer is high. Thus, the third catalyst coating layer (3), containing a large proportion of palladium, demonstrates a high level of activity in CO purification. The third catalyst coating layer (3) may also contain platinum provided the content thereof is within a range that does not offset the effects of the present invention.

The length ($L_3$) of the third catalyst coating layer is long enough to ensure that CO present in exhaust gas is sufficiently oxidized on the third catalyst coating layer (3), enabling CO present in exhaust gas to be purified by being oxidized to $CO_2$ with high efficiency. On the other hand, the length ($L_3$) of the third catalyst coating layer (3) is short enough to prevent contact with gas having a high HC concentration prior to being purified by the first catalyst coating layer (1). Namely, the third catalyst coating layer (3) is arranged on the downstream side of exhaust gas flow over a length that is shorter than the length (d) of the substrate (5). Thus, exhaust gas that has flown into the catalyst device contacts the third catalyst coating layer (3) after HC has been oxidized and removed with high efficiency by the first catalyst coating layer (1). Consequently, HC poisoning of Pd present in the third catalyst coating layer (3) is inhibited.

The third catalyst coating layer (3) is arranged in a lower layer on the downstream side of exhaust gas flow. As a result, after having passed the first catalyst coating layer (1), exhaust gas contacts the third catalyst coating layer (3) via the second catalyst coating layer (2). Thus, even in the case exhaust gas that has passed the first catalyst coating layer (1) contains residual HC, the frequency at which this residual HC contacts Pd present in the third catalyst coating layer (3) is lowered.

In the oxidation catalyst device for exhaust gas purification of the present embodiment, HC poisoning of Pd present in the third catalyst coating layer (3) is efficiently inhibited due to the third catalyst coating layer (3) being present in a lower layer on the downstream side of exhaust gas flow.

The following provides a detailed explanation of constituent elements of the oxidation catalyst device for exhaust gas purification of the present invention.

<First Catalyst Coating Layer>

The first catalyst coating layer present in the catalyst device for exhaust gas purification of the present invention contains platinum and palladium, the ratio of the weight of platinum to the weight of palladium is adjusted to a ratio that is suitable for an HC oxidation reaction, and is arranged on the upstream side of exhaust gas flow.

From the viewpoint of enhancing activity of the first catalyst coating layer in the HC oxidation reaction, the ratio ($W_{Pt1}/W_{Pd1}$) of the weight of the platinum ($W_{Pt1}$) to the weight of the palladium ($W_{Pd1}$) is 0.75 to 4.50. This ratio ($W_{Pt1}/W_{Pd1}$) is 0.80 or more, 0.90 or more, 1.00 or more, 1.25 or more, 1.50 or more or 1.75 or more, and 4.25 or less, 4.00 or less, 3.75 or less, 3.50 or less, 3.25 or less, 3.00 or less, 2.75 or less, 2.50 or less or 2.25 or less.

The ratio ($W_{Pt1}/W_{Pd1}$) in the first catalyst coating layer is most preferably about 2.00.

The ratio of the total of the weight of the platinum ($W_{Pt1}$) and the weight of the palladium ($W_{Pd1}$) contained in the first catalyst coating layer to a volume of 1 L (liter) of the substrate is, for example, 0.50 g/L or more, 0.75 g/L or more, 1.00 g/L or more or 1.25 g/L or more, and for example, 2.50 g/L or less, 2.25 g/L or less, 2.25 g/L or less or 1.75 g/L or less.

In the oxidation catalyst device for exhaust gas purification of the present invention, the efficiency of NO oxidation by the second catalyst coating layer and CO oxidation in the third catalyst coating layer are increased by sufficiently oxidizing HC present in exhaust gas that has flown into the catalyst device by the first catalyst coating layer, lowering the concentration of HC in exhaust gas farther downstream than the first catalyst coating layer, and inhibiting HC poisoning of Pd present in the second and third catalyst coating layers.

Thus, from the viewpoint of sufficiently carrying out oxidation of HC in the first catalyst coating layer, the total of the weight of platinum and the weight of palladium in the first catalyst coating layer is higher than the total of the weight of platinum and the weight of palladium in the second catalyst coating layer and third catalyst coating layer.

More specifically, the total ($W_{Pt1+Pd1}$) of the weight ($W_{Pt1}$) of platinum and the weight ($W_{Pd1}$) of palladium in the first catalyst coating layer is greater than the grand total ($W_{Pt2+Pd2}+W_{Pt3+Pd3}$) of the total ($W_{Pt2+Pd2}$) of the weight ($W_{Pt2}$) of platinum and the weight ($W_{Pd2}$) of palladium in the second catalyst coating layer and the total ($W_{Pt3+Pd3}$) of the weight ($W_{Pt3}$) of platinum and the weight ($W_{Pd3}$) of palladium in the third catalyst coating layer.

The proportion of the total ($W_{Pt1+Pd1}$) of the weight of platinum and the weight of palladium in the first catalyst coating layer in the grand total ($W_{Pt1+Pd1}+W_{Pt2+Pd2}+W_{Pt3+Pd3}$) is, for example, greater than 50% by weight, 55% by weight or more or 60% by weight or more from the viewpoint of sufficiently carrying out oxidation of HC in the first catalyst coating layer, and for example, 80% by weight or less, 75% by weight or less, 70% by weight or less or 65% by weight or less from the viewpoint maintaining a high level of catalyst activity of the second and third catalyst coating layers.

The platinum and palladium present in the first catalyst coating layer are respectively supported on suitable support particles. The support particles are, for example, particles of one or more types of oxides selected from oxides of Al, Si, Ce and Zr. More specifically, the support particles are selected from particles composed of, for example, alumina, silica, ceria, zirconia and composite oxides thereof.

The platinum and palladium in the first catalyst coating layer may be supported on the same catalyst particles or may be respectively supported on separate support particles. From the viewpoint of inhibiting decreases in catalyst activity accompanying an increase in particle diameter attributable to endurance by alloying the platinum and palladium, at least a portion, and preferably all, of the platinum and palladium are supported on the same support particles.

From the viewpoint of sufficiently oxidizing HC present in exhaust gas that has flown into the catalyst device in the first catalyst coating layer, the length of the first catalyst coating layer based on the length of the substrate is 8% or more, 9% or more, 10% or more, 20% or more, 30% or more or 40% or more. On the other hand, from the viewpoint of maintaining a high concentration of precious metal in the first catalyst coating layer to enable ignition of the first catalyst coating layer, the length of the first catalyst coating layer based on the length of the substrate is 55% or less, 50% or less, 40% or less, 30% or less or 20% or less.

The first catalyst coating layer may further contain other components as necessary. Examples of other components include oxide particles not having platinum or palladium supported thereon and inorganic binder. In addition, the first catalyst coating layer may further contain a precious metal other than platinum or palladium such as rhodium (Rh).

The oxide particles not having platinum or palladium supported thereon are particles of one or more types of oxides selected from Al, Si, Ce and Zr oxides, and more specifically, are selected from oxides composed of, for example, alumina, silica, ceria, zirconia or composite oxides thereof.

Examples of inorganic binder include alumina sol and titania sol.

<Second Catalyst Coating Layer>

The second catalyst coating layer present in the catalyst device for exhaust gas purification of the present invention contains platinum and palladium, the ratio of the weight of platinum to the weight of palladium is adjusted to a ratio that is suitable for realizing both a high level of activity of the NO oxidation reaction and heat resistance of the second catalyst coating layer, and is arranged in an upper layer on the downstream side of exhaust gas flow.

From the viewpoint of enhancing catalyst activity in the NO oxidation reaction, the ratio ($W_{Pt2}/W_{Pd2}$) of the weight of the platinum ($W_{Pt2}$) to the weight of the palladium ($W_{Pd2}$) in the second catalyst coating layer is greater than 4.50, 5.00 or more, 6.00 or more, 8.00 or more, 10.00 or more, 12.00 or more or 15.00 or more. On the other hand, from the viewpoint of realizing both NO oxidation activity and heat resistance of the second catalyst coating layer, the ratio ($W_{Pt2}/W_{Pd2}$) of the second catalyst coating layer is 25.0 or less, 22.0 or less, 20.0 or less, 18.0 or less, 16.0 or less or 15.0 or less.

The ratio of the total ($W_{Pt2+Pd2}$) of the weight of the platinum ($W_{Pt2}$) and the weight of the palladium ($W_{Pd2}$) contained in the second catalyst coating layer to a volume of 1 L of the substrate is, for example, 0.30 g/L or more, 0.40 g/L or more, 0.50 g/L or more or 0.60 g/L or more, and for example, 1.00 g/L or less, 0.90 g/L or less or 0.75 g/L or less.

The platinum and palladium present in the second catalyst coating layer are supported on support particles in the same manner as in the first catalyst coating layer, and may be supported together on the same support particles or each supported on separate support particles.

From the viewpoint of sufficiently oxidizing NO present in exhaust gas on the second catalyst coating layer to form $NO_2$, the length of the second catalyst coating layer based on the length of the substrate is 45% or more, 50% or more, 60% or more, 70% or more or 80% or more. On the other hand, from the viewpoint of allowing inflow exhaust gas to sufficiently contact the first catalyst coating layer and contact the second catalyst coating layer after HC concentration has lowered and inhibit HC poisoning of Pd present in the second catalyst coating layer, the length of the second catalyst coating layer based on the length of the substrate is 95% or less, 90% or less, 85% or less, 80% or less or 75% or less.

The second catalyst coating layer may contain other components similar to those in the first catalyst coating layer as necessary. Examples of other components include oxide particles not having platinum or palladium supported thereon, inorganic binder, and precious metals other than platinum and palladium (such as rhodium).

<Third Catalyst Coating Layer>

The third catalyst coating layer in the catalyst device for exhaust gas purification of the present invention at least contains palladium and may optionally further contain platinum. The ratio of the weight of platinum and the weight of palladium in the third catalyst coating layer is adjusted to a ratio that is suitable for the CO oxidation reaction, and is arranged in a lower layer on the downstream side of exhaust gas flow.

From the viewpoint of enhancing catalyst activity in the CO oxidation reaction, the ratio ($W_{Pt3}/W_{Pd3}$) of the weight of the platinum ($W_{Pt3}$) to the weight of the palladium ($W_{Pd3}$) in the third catalyst coating layer is 0.12 or less, 0.11 or less, 0.10 or less, 0.09 or less, 0.08 or less or 0.05 or less. The third catalyst coating layer is not required to contain platinum.

The ratio of the total ($W_{Pt3+Pd3}$) of the weight of the platinum ($W_{Pt3}$) and the weight of the palladium ($W_{Pd3}$) contained in the third catalyst coating layer to a volume of 1 L of the substrate is, for example, 0.15 g/L or more, 0.20 g/L or more or 0.25 g/L or more, and for example, 0.50 g/L or less, 0.45 g/L or less, 0.40 g/L or less or 0.35 g/L or less.

In the case palladium and platinum are present in the third catalyst coating layer, the platinum and palladium are supported on support particles in the same manner as in the first catalyst coating layer, and may be supported together on the same support particles or each supported on separate support particles.

From the viewpoint of sufficiently oxidizing CO present in exhaust gas on the third catalyst coating layer, the length of the third catalyst coating layer based on the length of the substrate is 45% or more, 50% or more, 60% or more, 70% or more or 80% or more. On the other hand, from the viewpoint of allowing inflow exhaust gas to sufficiently contact the first catalyst coating layer and contact the third catalyst coating layer after HC concentration has lowered and inhibit HC poisoning of Pd present in the third catalyst coating layer, the length of the third catalyst coating layer based on the length of the substrate is 95% or less, 90% or less, 85% or less, 80% or less or 75% or less.

The third catalyst coating layer may contain other components similar to those in the first catalyst coating layer as necessary. Examples of other components include oxide particles not having platinum or palladium supported thereon, inorganic binder, and precious metals other than platinum and palladium (such as rhodium).

<Total Amount of Platinum and Palladium in First to Third Catalyst Coating Layers>

The proportion of the grand total ($W_{Pt1+Pd1}+W_{Pt2+Pd2}+W_{Pt3+Pd3}$) of the weight of platinum and the weight of palladium in the first to third catalyst coating layers based on a volume of 1 L of the substrate is, for example, 1.50 g/L or more, 1.75 g/L or more, 2.00 g/L or more or 2.25 g/L or more from the viewpoint of sufficiently increasing oxidation activity of exhaust gas components, and is, for example, 4.00 g/L or less, 3.50 g/L or less, 3.00 g/L or less, 2.75 g/L or less or 2.50 g/L or less from the viewpoint of reducing production cost of the oxidation catalyst device for exhaust gas purification.

<Substrate>

A substrate typically used as a substrate of exhaust gas purification catalysts may be used for the substrate of the present invention. Examples thereof include flow-through type (open flow type) substrates, such as monolith honeycomb substrates, composed of cordierite, SiC, metal or metal oxide particles. A monolith honeycomb substrate typically has an external shape of roughly that of a cylinder or prism, and has a large number of cells communicating in the axial direction.

The volume of the substrate is, for example, 0.1 L (liter) or more, 0.2 L or more, 0.3 L or more, 0.4 L or more or 0.5 L or more, and for example, 4.0 L or less, 3.5 L or less, 3.0 L or less, 2.5 L or less, 2.0 L or less or 1.5 L or less.

In the catalyst device for exhaust gas purification of the present invention, the substrate is covered with at least one of the first to third catalyst coating layers over the entire length thereof. As a result of the substrate being covered by at least one of the first to third catalyst coating layers over the entire length thereof, destruction of the substrate caused by a difference in coefficient of thermal expansion between the substrate and the first to third catalyst coating layers can be inhibited.

A specific example of the substrate being covered by at least one of the first to third catalyst coating layers over the entire surface thereof consists of the first catalyst coating layer being present extending from the exhaust gas inlet end of the substrate in the downstream direction of exhaust gas flow, the second catalyst coating layer and the third catalyst coating layer each being present extending from the exhaust gas outlet end of the substrate in the upstream direction of exhaust gas flow, and the total of the length of the first catalyst coating layer and the length of the longer of the second catalyst coating layer and the third catalyst coating layer being equal to or greater than the length of the substrate.

The total of the length of the first coating material layer and the length of the longer of the second catalyst coating layer and the third catalyst coating layer may exceed the length of the substrate. In this case, the first catalyst coating layer and at least one of the second catalyst coating layer and third catalyst coating layer have a layered region layered on the substrate. The first catalyst coating layer is the upper layer in this layered region.

In the catalyst device for exhaust gas purification shown in FIG. 1, the first catalyst coating layer (1) is present extending from the exhaust gas inlet end of the substrate (5) in the downstream direction of exhaust gas flow, the second catalyst coating layer (2) and the third catalyst coating layer (3) are each present extending from the exhaust gas outlet end of the substrate in the upstream direction of exhaust gas flow, the length ($L_3$) of the third catalyst coating layer (3) is longer than the length ($L_2$) of the second catalyst coating layer (2), the total of the length ($L_1$) of the first catalyst coating layer (1) and the length of the third catalyst coating layer (3) exceeds the length (d) of the substrate (5), and as a result thereof the substrate (5) is covered by at least one of the first to third catalyst coating layers over the entire length (d) thereof.

In the catalyst device for exhaust gas purification shown in FIG. 1, the first catalyst coating layer (1) and the second catalyst coating layer (2) and third catalyst coating layer (3) have a layered region layered on the substrate, and the first catalyst coating layer (1) is the upper layer.

<<Method for Producing Oxidation Catalyst Device for Exhaust Gas Purification>>

The oxidation catalyst device for exhaust gas purification of the present embodiment is produced by forming first to third catalyst coating layers at prescribed locations on a substrate. More specifically, the oxidation catalyst device for exhaust gas purification of the present embodiment is produced according to the method indicated below.

The method for producing an oxidation catalyst device for exhaust gas purification includes:

coating a slurry for forming a third catalyst coating layer over a prescribed length from the exhaust gas outlet end of a desired substrate followed by firing to form the third catalyst coating layer, coating a slurry for forming a second catalyst coating layer over a prescribed length from the exhaust gas outlet end of the substrate following formation of the third catalyst coating layer followed by firing to form the second catalyst coating layer, and coating a slurry for forming a first catalyst coating layer over a prescribed length from the exhaust gas inlet end of the substrate following formation of the second and third catalyst coating layers followed by firing to form the first catalyst coating layer.

A substrate suitably selected from the aforementioned examples of substrates used as substrates in the oxidation catalyst device for exhaust gas purification of the present embodiment is used for the substrate.

The slurries for forming the first to third catalyst coating layers are each slurries obtained by dispersing platinum and palladium at a prescribed ratio, oxide particles having the platinum and palladium simultaneously or separately supported thereon, and other optionally used components in a medium such as water. The slurry for forming the third catalyst coating layer may not contain platinum depending on the desired composition of the third catalyst coating layer in the oxidation catalyst device for exhaust gas purification.

Oxide particles having platinum and palladium simultaneously or separately supported thereon are produced by mixing a precursor of a desired precious metal and oxide particles in a suitable medium such as water followed by firing. Examples of the precious metal precursor include halides, nitrates and sulfates of platinum or palladium.

The type and amount of each component in the slurries for forming the first to third catalyst coating layers is suitably set according to the desired compositions of the first to third catalyst coating layers in the oxidation catalyst device for exhaust gas purification.

Coating of the slurry for forming each catalyst coating layer onto the substrate is carried out by, for example, a known washcoating method. Firing after having coated the slurry for forming each catalyst coating layer onto the substrate is carried out according to a known method at a temperature of, for example, 400° C. or higher or 450° C. or higher and for example, 1,000° C. or lower, 900° C. or lower or 800° C. or lower, for a duration of for example, 10 minutes or more, 30 minutes or more or 1 hour or more, and for example, 48 hours or less, 24 hours or less, 12 hours or less or 6 hours or less.

<<Catalyst System for Exhaust Gas Purification>>

The oxidation catalyst device for exhaust gas purification of the present invention is suitable for use as a DOC in a catalyst system for purifying exhaust gas emitted from an internal combustion engine, and particularly a diesel engine. Thus, according to a different viewpoint of the present invention, a catalyst system for exhaust gas purification is provided that contains the oxidation catalyst device for exhaust gas purification of the present invention and a selective catalytic reduction device for exhaust gas purification located downstream therefrom in the direction of exhaust gas flow.

The catalyst system for exhaust gas purification of the present invention may further have a soot filter and post-stage oxidation catalyst, and for example, the oxidation catalyst device for exhaust gas purification of the present invention, a soot filter, a selective catalytic reduction device for exhaust gas purification, and a post-stage oxidation catalyst may be arranged in that order starting from the upstream side of exhaust gas flow.

The soot filter captures soot discharged from an internal combustion engine. The captured soot is treated by being oxidized by oxygen or by $NO_2$ emitted from the oxidation catalyst device for exhaust gas purification of the present invention.

The selective catalytic reduction device for exhaust gas purification purifies $N_2$ and $H_2O$ by, for example, supplying aqueous urea and using the $NH_3$ formed from the aqueous urea to reduce $NO_2$, formed by the oxidation catalyst device for exhaust gas purification of the present invention, and as well as residual NO.

The post-stage oxidation catalyst purifies excess $NH_3$ discharged from the selective catalytic reduction device for exhaust gas purification by oxidizing to $N_2$ and $H_2O$.

EXAMPLES

Preparation of Slurries for Forming Catalyst Coating Layers

Preparation of Slurry for Forming First Catalyst Coating Layer

Preparation Example 1A

An aqueous solution containing an equivalent of 2.00 g of platinum nitrate as Pt metal, an aqueous solution containing an equivalent of 1.00 g of palladium nitrate as Pd metal, 50 g of alumina and 150 g of pure water were mixed followed by drying at 100° C. and firing at 500° C. to prepare Pt/Pd-supported alumina powder 1.

The entire amount of the Pt/Pd-supported alumina powder 1, 30 g of β-zeolite powder, 2.0 g (as solid) of alumina sol, and 180 g of pure water were mixed and then sized to obtain Slurry 1A.

Preparation Examples 1B to 1E

Slurries 1B to 1E were prepared in the same manner as Preparation Example 1A with the exception of using platinum nitrate and palladium nitrate in the amounts respectively shown in Table 1. Table 1 also shows the compositions of the raw material components used in Preparation Examples 1A to 1E.

TABLE 1

| | | Preparation of Slurry for Forming First Catalyst Coating Layer | | | | | | |
|---|---|---|---|---|---|---|---|---|
| | | | Precious Metal-Supported Oxide | | | | Other Components | |
| | Slurry | Type | Platinum Nitrate (g-Pt) | Palladium Nitrate (g-Pd) | Pt/Pd (wt/wt) | Alumina (g) | β-zeolite (g) | Alumina sol (g-solid fraction) |
| Preparation Example 1A | Slurry 1A | Pt/Pd-supported alumina powder | 2.00 | 1.00 | 2.00 | 50.0 | 30.0 | 2.0 |
| Preparation Example 1B | Slurry 1B | Pt/Pd-supported alumina powder | 2.40 | 0.60 | 4.00 | 50.0 | 30.0 | 2.0 |

TABLE 1-continued

Preparation of Slurry for Forming First Catalyst Coating Layer

| | | | Precious Metal-Supported Oxide | | | | Other Components | |
|---|---|---|---|---|---|---|---|---|
| | Slurry | Type | Platinum Nitrate (g-Pt) | Palladium Nitrate (g-Pd) | Pt/Pd (wt/wt) | Alumina (g) | β-zeolite (g) | Alumina sol (g-solid fraction) |
| Preparation Example 1C | Slurry 1C | Pt/Pd-supported alumina powder | 1.50 | 1.50 | 1.00 | 50.0 | 30.0 | 2.0 |
| Preparation Example 1D | Slurry 1D | Pt/Pd-supported alumina powder | 2.50 | 0.50 | 5.00 | 50.0 | 30.0 | 2.0 |
| Preparation Example 1E | Slurry 1E | Pt/Pd-supported alumina powder | 1.00 | 2.00 | 0.50 | 50.0 | 30.0 | 2.0 |

Preparation of Slurry for Forming Second Catalyst Coating Layer

Preparation Example 2A

An aqueous solution containing an equivalent of 1.00 g of platinum nitrate as Pt metal, an aqueous solution containing an equivalent of 0.20 g of palladium nitrate as Pd metal, 25 g of alumina and 70 g of pure water were mixed followed by drying at 100° C. and firing at 500° C. to prepare Pt/Pd-supported alumina powder 2.

The entire amount of the Pt/Pd-supported alumina powder 2, 20 g of β-zeolite powder, 2.0 g (as solid) of alumina sol, and 80 g of pure water were mixed and then sized to obtain Slurry 2A.

Preparation Examples 2B to 2E

Slurries 2B to 2E were prepared in the same manner as Preparation Example 2A with the exception of using the platinum nitrate and palladium nitrate in the amounts respectively shown in Table 2. Table 2 also shows the compositions of the raw material components used in Preparation Examples 2A to 2E.

Preparation of Slurry for Forming Third Catalyst Coating Layer

Preparation Example 3A

An aqueous solution containing an equivalent of 0.60 g of palladium nitrate as Pd metal, 40 g of alumina and 120 g of pure water were mixed followed by drying at 100° C. and firing at 500° C. to prepare Pd-supported alumina powder 3a.

The entire amount of the Pt/Pd-supported alumina powder 3a, 10 g of β-zeolite powder, 2.0 g (as solid) of alumina sol, and 160 g of pure water were mixed and then sized to obtain Slurry 3A.

Preparation Example 3B

An aqueous solution containing an equivalent of 0.05 g of platinum nitrate as Pt metal, an aqueous solution containing an equivalent of 0.55 g of palladium nitrate as Pd metal, 40 g of alumina and 120 g of pure water were mixed followed by drying at 100° C. and firing at 500° C. to prepare Pt/Pd-supported alumina powder 3b.

TABLE 2

Preparation of Slurry for Forming Second Catalyst Coating Layer

| | | | Precious Metal-Supported Oxide | | | | Other Components | |
|---|---|---|---|---|---|---|---|---|
| | Slurry | Type | Platinum Nitrate (g-Pt) | Palladium Nitrate (g-Pd) | Pt/Pd (wt/wt) | Alumina (g) | β-zeolite (g) | Alumina sol (g-solid fraction) |
| Preparation Example 2A | Slurry 2A | Pt/Pd-supported alumina powder | 1.00 | 0.20 | 5.00 | 25.0 | 20.0 | 2.0 |
| Preparation Example 2B | Slurry 2B | Pt/Pd-supported alumina powder | 1.14 | 0.06 | 19.0 | 25.0 | 20.0 | 2.0 |
| Preparation Example 2C | Slurry 2C | Pt/Pd-supported alumina powder | 1.09 | 0.11 | 9.91 | 25.0 | 20.0 | 2.0 |
| Preparation Example 2D | Slurry 2D | Pt/Pd-supported alumina powder | 1.16 | 0.04 | 29.0 | 25.0 | 20.0 | 2.0 |
| Preparation Example 2E | Slurry 2E | Pt/Pd-supported alumina powder | 0.96 | 0.24 | 4.00 | 25.0 | 20.0 | 2.0 |

The entire amount of the Pt/Pd-supported alumina powder 3b, 10 g of β-zeolite powder, 2.0 g (as solid) of alumina sol, and 160 g of pure water were mixed and then sized to obtain Slurry 3B.

Preparation Examples 3C to 3E

Slurries 3C to 3E were prepared in the same manner as Preparation Example 3B with the exception of using platinum nitrate and palladium nitrate in the amounts respectively shown in Table 3. Table 3 also shows the compositions of the raw material components used in Preparation Examples 3A to 3E.

The entire amount of the Pt/Pd-supported alumina powder 4a obtained above, the entire amount of the Pd-supported alumina powder 4b obtained above, 40 g of A-zeolite powder, 4.0 g of alumina sol as solid, and 340 g of pure water were mixed and then sized to obtain Slurry 4A.

Preparation Example 4B

An aqueous solution containing an equivalent of 1.00 g of platinum nitrate as Pt metal, an aqueous solution containing an equivalent of 0.20 g of palladium nitrate as Pd metal, 25 g of alumina and 70 g of pure water were mixed followed by drying at 100° C. and firing at 500° C. to prepare Pt/Pd-supported alumina powder 4c.

An aqueous solution containing an equivalent of 0.60 g of palladium nitrate as Pd metal, 40 g of alumina and 120 g of pure water were mixed followed by drying at 100° C. and firing at 500° C. to prepare Pd-supported alumina powder 4d.

The entire amount of the Pt/Pd-supported alumina powder 4c obtained above, the entire amount of the Pd-supported alumina powder 4d obtained above, 30 g of β-zeolite powder, 4.0 g of alumina sol as solid, and 240 g of pure water were mixed and then sized to obtain Slurry 4B.

The compositions of the raw materials used in Preparation Examples 4A and 4B are summarized in Table 4.

TABLE 3

Preparation of Slurry for Forming Third Catalyst Coating Layer

| | Slurry | Type | Precious Metal-Supported Oxide | | | | Other Components | |
| --- | --- | --- | --- | --- | --- | --- | --- | --- |
| | | | Platinum Nitrate (g-Pt) | Palladium Nitrate (g-Pd) | Pt/Pd (wt/wt) | Alumina (g) | β-zeolite (g) | Alumina sol (g-solid fraction) |
| Preparation Example 3A | Slurry 3A | Pd-supported alumina powder | 0 | 0.60 | 0 | 40.0 | 10.0 | 2.0 |
| Preparation Example 3B | Slurry 3B | Pt/Pd-supported alumina powder | 0.05 | 0.55 | 0.09 | 40.0 | 10.0 | 2.0 |
| Preparation Example 3C | Slurry 3C | Pt/Pd-supported alumina powder | 0.10 | 0.50 | 0.20 | 40.0 | 10.0 | 2.0 |
| Preparation Example 3D | Slurry 3D | Pt/Pd-supported alumina powder | 0.07 | 0.53 | 0.13 | 40.0 | 10.0 | 2.0 |
| Preparation Example 3E | Slurry 3E | Pt/Pd-supported alumina powder | 0.40 | 0.20 | 2.00 | 40.0 | 10.0 | 2.0 |

Preparation of Slurry for Forming Comparative Catalyst Coating Layer

Preparation Example 4A

An aqueous solution containing an equivalent of 2.00 g of platinum nitrate as Pt metal, an aqueous solution containing an equivalent of 1.00 g of palladium nitrate as Pd metal, 50 g of alumina and 150 g of pure water were mixed followed by drying at 100° C. and firing at 500° C. to prepare Pt/Pd-supported alumina powder 4a.

An aqueous solution containing an equivalent of 0.60 g of palladium nitrate as Pd metal, 40 g of alumina and 120 g of pure water were mixed followed by drying at 100° C. and firing at 500° C. to prepare Pd-supported alumina powder 4b.

TABLE 4

Preparation of Slurry for Forming Comparative Catalyst Coating Layer

| | Slurry | Type | Precious Metal-Supported Oxide | | | | Other Components | |
| --- | --- | --- | --- | --- | --- | --- | --- | --- |
| | | | Platinum nitrate (g-Pt) | Palladium nitrate (g-Pd) | Pt/Pd (wt/wt) | Alumina (g) | β-zeolite (g) | Alumina sol (g-solid fraction) |
| Preparation Example 4A | Slurry 4A | Pt/Pd-supported alumina powder | 2.00 | 1.00 | 2.00 | 50.0 | 40.0 | 4.0 |
| | | Pd-supported alumina powder | 0 | 0.60 | 0 | 40.0 | | |
| | | Total amount in slurry | 2.00 | 1.60 | 1.25 | 90.0 | | |
| Preparation Example 4B | Slurry 4B | Pt/Pd-supported alumina powder | 1.00 | 0.20 | 5.00 | 25.0 | 30.0 | 4.0 |
| | | Pd-supported alumina powder | 0 | 0.60 | 0 | 40.0 | | |
| | | Total amount in slurry | 1.00 | 0.80 | 1.25 | 65.0 | | |

Example 1

<Production of Catalyst Device>

A catalyst device having the catalyst coating layer configuration shown in FIG. 2(a) was produced using a cordierite flow-through type honeycomb substrate having a diameter of 129 mm and length of 150 mm (volume: 1.96 L) for the substrate (5). The catalyst device was produced as indicated below.

The entire amount of Slurry 3A prepared in accordance with Preparation Example 3A was arranged on the exhaust gas outlet end of the substrate (5) followed by aspirating from the exhaust gas inlet end on the opposite end to coat so that the length of the coating layer was equal to 80% of the length (d) of the substrate (5) from the exhaust gas outlet end of the substrate (5).

The coating layer was dried at 100° C. followed by heat-treating at 500° C. to form the third catalyst coating layer (3) on the substrate (5). This third catalyst coating layer (3) was present extending from the exhaust gas outlet end of the substrate (5) in the upstream direction of exhaust gas flow, and the length ($L_3$) of the third catalyst coating layer (3) was 80% of the length (d) of the substrate (5).

The entire amount of Slurry 2A prepared in accordance with Preparation Example 2A was arranged on the exhaust gas outlet end of the substrate (5) after having formed the third catalyst coating layer (3) followed by aspirating from the exhaust gas inlet end on the opposite end to coat so that the length of the coating layer was equal to 80% of the length (d) of the substrate (5) from the exhaust gas outlet end of the substrate (5).

The coating layer was dried at 100° C. followed by heat-treating at 500° C. to form the second catalyst coating layer (2) in the upper layer of the third catalyst coating layer (3) on the substrate (5). This second catalyst coating layer (2) was present in the upper layer of the third catalyst coating layer (3) extending from the exhaust gas outlet end of the substrate (5) in the upstream direction of exhaust gas flow, and the length ($L_2$) of the second catalyst coating layer (2) was 80% of the length (d) of the substrate (5).

The entire amount of Slurry 1A prepared in accordance with Preparation Example 1A was arranged on the exhaust gas inlet end of the substrate (5) after having formed the second catalyst coating layer (2) and the third catalyst coating layer (3) followed by aspirating from the exhaust gas outlet end on the opposite end to coat so that the length of the coating layer was equal to 40% of the length (d) of the substrate (5) from the exhaust gas inlet end of the substrate (5).

The coating layer was dried at 100° C. followed by heat-treating at 500° C. to form the first catalyst coating layer (1) on the substrate (5) having the second catalyst coating layer (2) and the third catalyst coating layer (3) and produce a catalyst device. This first catalyst coating layer (1) was present extending from the exhaust gas inlet end of the substrate (5) in the downstream direction of exhaust gas flow, and the length ($L_1$) of the first catalyst coating layer (1) was 40% of the length (d) of the substrate (5). The first coating layer (1) was the uppermost layer in the layered portion of the first catalyst coating layer (1) and the second catalyst coating layer (2) and the third catalyst coating layer (3).

<Evaluation of Catalyst Device>

After subjecting to endurance treatment in a lean atmosphere, the catalyst device was installed in the exhaust gas path of a common rail-type diesel engine having a displacement of 2,500 cc followed by measurement of HC purification rate, NO$_2$ formation rate and CO purification rate when the engine was operated in the New European Driving Cycle (NEDC) mode. More specifically, after setting the average exhaust gas temperature during operation to 160° C. by adjusting the load, the engine was operated in the NEDC mode followed by respectively measuring the total amount of each gas present in exhaust gas emitted during operation in the NEDC mode at the inlet and outlet of the catalyst device. HC purification rate, NO$_2$ formation rate and CO purification rate during operation in the NEDC mode were then calculated by substituting the resulting measured values into the equations indicated below. As a result, HC purification rate was 83%, NO$_2$ formation rate was 30% and CO purification rate was 85%.

[Math. 1]

$$\text{HC purification rate (\%)} = \frac{\text{Amount of HC at catalyst device inlet (g)} - \text{amount of HC at catalyst device outlet (g)}}{\text{amount of HC at catalyst device inlet (g)}} \times 100$$

$$\text{NO}_2 \text{ formation rate (\%)} = \frac{\text{Amount of NO}_2 \text{ at catalyst device outlet (g)}}{\text{amount of NO}_2 \text{ at catalyst device inlet (g)}} \times 100$$

$$\text{CO purification rate (\%)} = \frac{\text{Amount of CO at catalyst device inlet (g)} - \text{amount of CO at catalyst device outlet (g)}}{\text{amount of CO at catalyst device inlet (g)}} \times 100$$

Examples 2 to 6 and Comparative Examples 1 to 7

Catalyst devices having the catalyst coating layer configuration shown in FIG. 2(a) were produced and evaluated in the same manner as Example 1 with the exception of respectively changing the slurries used to form each of the first to third catalyst coating layers to those described in Table 5. The evaluation results are shown in Table 6 together with the evaluation results for Example 1.

Comparative Example 8

A catalyst device having the catalyst coating layer configuration shown in FIG. 2(b) was produced and evaluated. Specific production and evaluation were carried out in the manner indicated below. The same flow-through type honeycomb substrate as that used in Example 1 was used for the substrate (5).

<Production of Catalyst Device>

The entire amount of Slurry 2A prepared in accordance with Preparation Example 2A was arranged on the exhaust gas outlet end of the substrate (5) followed by aspirating from the exhaust gas inlet end on the opposite end to coat so that the length of the coating layer was equal to 80% of the length (d) of the substrate (5) from the exhaust gas outlet end of the substrate (5).

The coating layer was dried at 100° C. followed by heat-treating at 500° C. to form the second catalyst coating layer (2) on the substrate (5). This second catalyst coating layer (2) was present extending from the exhaust gas outlet end of the substrate (5) in the upstream direction of exhaust gas flow, and the length ($L_2$) of the second catalyst coating layer (2) was 80% of the length (d) of the substrate (5).

The entire amount of Slurry 4A prepared in accordance with Preparation Example 4A was arranged on the exhaust gas inlet end of the substrate (5) followed by aspirating from the exhaust gas outlet end on the opposite end to coat so that the length of the coating layer was equal to 40% of the length (d) of the substrate (5) from the exhaust gas inlet end of the substrate (5).

The coating layer was dried at 100° C. followed by heat-treating at 500° C. to form the first catalyst coating layer (1) on the substrate (5) having the second catalyst coating layer (2) and produce a catalyst device. This first catalyst coating layer (1) was present extending from the exhaust gas inlet end of the substrate (5) in the downstream direction of exhaust gas flow, and the length ($L_1$) of the first catalyst coating layer (1) was 40% of the length (d) of the substrate (5). The first catalyst coating layer (1) was the uppermost layer in the layered portion of the first catalyst coating layer (1) and the second catalyst coating layer (2).

<Evaluation of Catalyst Device>

The resulting catalyst device was evaluated in the same manner as Example 1. The results are shown in Table 6.

Comparative Example 9

Figure 2:
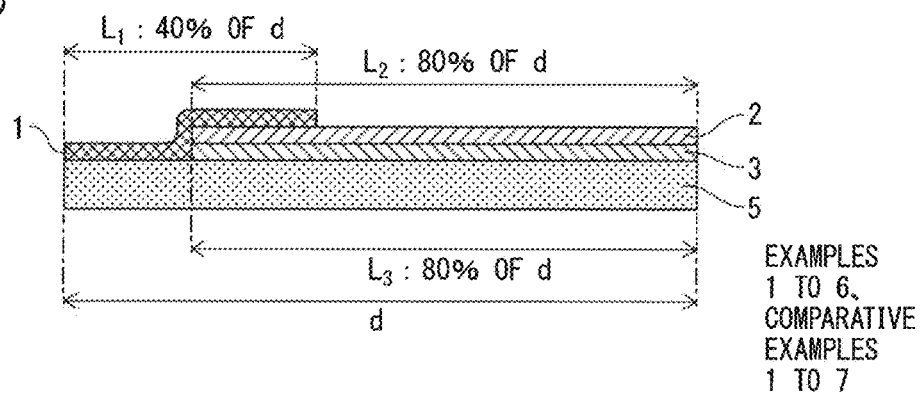
Figure 2:
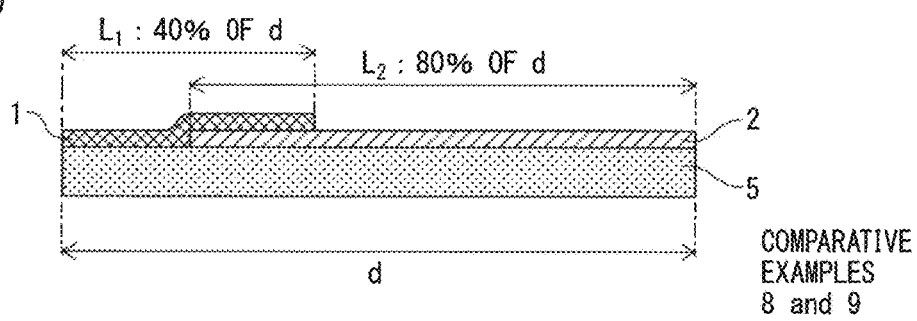

A catalyst device having the catalyst coating layer configuration shown in FIG. 2(*b*) was produced and evaluated in the same manner as Comparative Example 8 with the exception of respectively changing the slurries used to form the first and second catalyst coating layers to those described in Table 5. The results are shown in Table 6.

TABLE 5

Production of Oxidation Catalyst Devices for Exhaust Gas Purification

| | First Catalyst Coating Layer | | | Second Catalyst Coating Layer | | | Third Catalyst Coating Layer | | |
|---|---|---|---|---|---|---|---|---|---|
| | Slurry | $W_{Pt1}/W_{Pd1}$ | Length ratio*[1] | Slurry | $W_{Pt2}/W_{Pd2}$ | Length ratio*[2] | Slurry | $W_{Pt3}/W_{Pd3}$ | Length ratio*[2] |
| Ex. 1 | Slurry 1A | 2.00 | 40% | Slurry 2A | 5.00 | 80% | Slurry 3A | 0 | 80% |
| Ex. 2 | Slurry 1C | 1.00 | 40% | Slurry 2A | 5.00 | 80% | Slurry 3A | 0 | 80% |
| Ex. 3 | Slurry 1B | 4.00 | 40% | Slurry 2A | 5.00 | 80% | Slurry 3A | 0 | 80% |
| Ex. 4 | Slurry 1A | 2.00 | 40% | Slurry 2C | 9.91 | 80% | Slurry 3A | 0 | 80% |
| Ex. 5 | Slurry 1A | 2.00 | 40% | Slurry 2B | 19.0 | 80% | Slurry 3A | 0 | 80% |
| Ex. 6 | Slurry 1A | 2.00 | 40% | Slurry 2A | 5.00 | 80% | Slurry 3B | 0.09 | 80% |
| Comp. Ex. 1 | Slurry 1E | 0.50 | 40% | Slurry 2A | 5.00 | 80% | Slurry 3A | 0 | 80% |
| Comp. Ex. 2 | Slurry 1D | 5.00 | 40% | Slurry 2A | 5.00 | 80% | Slurry 3A | 0 | 80% |
| Comp. Ex. 3 | Slurry 1A | 2.00 | 40% | Slurry 2E | 4.00 | 80% | Slurry 3A | 0 | 80% |
| Comp. Ex. 4 | Slurry 1A | 2.00 | 40% | Slurry 2D | 29.0 | 80% | Slurry 3A | 0 | 80% |
| Comp. Ex. 5 | Slurry 1A | 2.00 | 40% | Slurry 2A | 5.00 | 80% | Slurry 3D | 0.13 | 80% |
| Comp. Ex. 6 | Slurry 1A | 2.00 | 40% | Slurry 2A | 5.00 | 80% | Slurry 3C | 0.20 | 80% |
| Comp. Ex. 7 | Slurry 1A | 2.00 | 40% | Slurry 2A | 5.00 | 80% | Slurry 3E | 2.00 | 80% |
| Comp. Ex. 8 | Slurry 4A | 1.25 | 40% | Slurry 2A | 5.00 | 80% | — | — | — |
| Comp. Ex. 9 | Slurry 1A | 2.00 | 40% | Slurry 4B | 1.25 | 80% | — | — | — |

*[1] Ratio of length of catalyst coating layer from gas inlet end of honeycomb substrate to total length of substrate (%)

*[2] Ratio of length of catalyst coating layer from gas outlet end of honeycomb substrate to total length of substrate (%)

TABLE 6

Evaluation Results (Effect of Ratio of Weights of Platinum and Palladium in First to Third Catalyst Coating Layers)

| | First Catalyst Coating Layer | | | | Second Catalyst Coating Layer | | | | Third Catalyst Coating Layer | | | |
|---|---|---|---|---|---|---|---|---|---|---|---|---|
| | Pt (g) | Pd (g) | $W_{Pt1}/W_{Pd1}$ | Length ratio*[1] | Pt (g) | Pd (g) | $W_{Pt2}/W_{Pd2}$ | Length ratio*[2] | Pt (g) | Pd (g) | $W_{Pt3}/W_{Pd3}$ | Length ratio*[2] |
| Ex. 1 | 2.00 | 1.00 | 2.00 | 40% | 1.00 | 0.20 | 5.00 | 80% | 0 | 0.60 | 0 | 80% |
| Comp. Ex. 1 | 1.00 | 2.00 | 0.50 | 40% | 1.00 | 0.20 | 5.00 | 80% | 0 | 0.60 | 0 | 80% |
| Ex. 2 | 1.50 | 1.50 | 1.00 | 40% | 1.00 | 0.20 | 5.00 | 80% | 0 | 0.60 | 0 | 80% |
| Ex. 3 | 2.40 | 0.60 | 4.00 | 40% | 1.00 | 0.20 | 5.00 | 80% | 0 | 0.60 | 0 | 80% |
| Comp. Ex. 2 | 2.50 | 0.50 | 5.00 | 40% | 1.00 | 0.20 | 5.00 | 80% | 0 | 0.60 | 0 | 80% |
| Comp. Ex. 3 | 2.00 | 1.00 | 2.00 | 40% | 0.96 | 0.24 | 4.00 | 80% | 0 | 0.60 | 0 | 80% |
| Ex. 4 | 2.00 | 1.00 | 2.00 | 40% | 1.09 | 0.11 | 9.91 | 80% | 0 | 0.60 | 0 | 80% |
| Ex. 5 | 2.00 | 1.00 | 2.00 | 40% | 1.14 | 0.06 | 19.00 | 80% | 0 | 0.60 | 0 | 80% |
| Comp. Ex. 4 | 2.00 | 1.00 | 2.00 | 40% | 1.16 | 0.04 | 29.00 | 80% | 0 | 0.60 | 0 | 80% |
| Ex. 6 | 2.00 | 1.00 | 2.00 | 40% | 1.00 | 0.20 | 5.00 | 80% | 0.05 | 0.55 | 0.09 | 80% |
| Comp. Ex. 5 | 2.00 | 1.00 | 2.00 | 40% | 1.00 | 0.20 | 5.00 | 80% | 0.07 | 0.53 | 0.13 | 80% |
| Comp. Ex. 6 | 2.00 | 1.00 | 2.00 | 40% | 1.00 | 0.20 | 5.00 | 80% | 0.10 | 0.50 | 0.20 | 80% |
| Comp. Ex. 7 | 2.00 | 1.00 | 2.00 | 40% | 1.00 | 0.20 | 5.00 | 80% | 0.40 | 0.20 | 2.00 | 80% |
| Comp. Ex. 8 | 2.00 | 1.60 | 1.25 | 40% | 1.00 | 0.20 | 5.00 | 80% | — | — | — | — |
| Comp. Ex. 9 | 2.00 | 1.00 | 2.00 | 40% | 1.00 | 0.80 | 1.25 | 80% | — | — | — | — |

TABLE 6-continued

Evaluation Results (Effect of Ratio of Weights of Platinum and Palladium in First to Third Catalyst Coating Layers)

|  | Total Precious Metals*[3] | | | HC | NO$_2$ | CO |
|---|---|---|---|---|---|---|
|  | Pt (g/L) | Pd (g/L) | Total (g/L) | Purification Rate (%) | Generation Rate (%) | Purification Rate (%) |
| Ex. 1 | 1.53 | 0.92 | 2.45 | 83 | 30 | 85 |
| Comp. Ex. 1 | 1.02 | 1.43 | 2.45 | 61 | 22 | 58 |
| Ex. 2 | 1.28 | 1.17 | 2.45 | 86 | 31 | 84 |
| Ex. 3 | 1.73 | 0.71 | 2.45 | 78 | 28 | 80 |
| Comp. Ex. 2 | 1.79 | 0.66 | 2.45 | 63 | 23 | 70 |
| Comp. Ex. 3 | 1.51 | 0.94 | 2.45 | 85 | 8 | 87 |
| Ex. 4 | 1.58 | 0.87 | 2.45 | 81 | 34 | 83 |
| Ex. 5 | 1.60 | 0.85 | 2.45 | 80 | 35 | 82 |
| Comp. Ex. 4 | 1.61 | 0.84 | 2.45 | 81 | 10 | 82 |
| Ex. 6 | 1.56 | 0.89 | 2.45 | 83 | 31 | 82 |
| Comp. Ex. 5 | 1.57 | 0.88 | 2.45 | 83 | 30 | 64 |
| Comp. Ex. 6 | 1.58 | 0.87 | 2.45 | 82 | 32 | 63 |
| Comp. Ex. 7 | 1.73 | 0.71 | 2.45 | 82 | 31 | 66 |
| Comp. Ex. 8 | 1.53 | 0.92 | 2.45 | 76 | 32 | 67 |
| Comp. Ex. 9 | 1.53 | 0.92 | 2.45 | 80 | 66 | 11 |

*[1] Ratio of length of catalyst coating layer from gas inlet end of honeycomb substrate to total length of honeycomb substrate (%)
*[2] Ratio of length of catalyst coating layer from gas outlet end of honeycomb substrate to total length of honeycomb substrate (%)
*[3] Value obtained by dividing total amount of precious metal supported on first to third catalyst coating layers by substrate volume (1.96 L)

The ratios ($W_{Pt1}/W_{Pd1}$, $W_{Pt2}/W_{Pd2}$ and $W_{Pt3}/W_{Pd3}$) in Tables 5 and 6 refer to the ratio of the weight of platinum ($W_{Pt1}$, $W_{Pt2}$ or $W_{Pt3}$) and the ratio of palladium ($W_{Pd1}$, $W_{Pd2}$ or $W_{Pd3}$) in the first to third catalyst coating layers.

With reference to Table 6, in the catalyst devices of Comparative Example 1, in which the ratio ($W_{Pt1}/W_{Pd1}$) of the weight of platinum ($W_{Pt1}$) to the weight of palladium ($W_{Pd1}$) in the first catalyst coating layer is below the prescribed range of the present invention, and Comparative Example 2, in which the ratio ($W_{Pt1}/W_{Pd1}$) of the weight of platinum ($W_{Pt1}$) to the weight of palladium ($W_{Pd1}$) in the first catalyst coating layer exceeds the prescribed range of the present invention, HC purification rates were low and CO purification rates in particular exhibited low values. In contrast, in the catalyst devices of Examples 1 to 3, in which the ratio ($W_{Pt1}/W_{Pd1}$) between the two parameters in the first catalyst coating layer is within the prescribed range of the present invention, HC purification rate was 78% or more, NO$_2$ formation rate was 28% or more, and CO purification rate was 80% or more, with high values being demonstrated for all parameters.

The reason for the low HC and CO purification rates in the catalyst devices of Comparative Examples 1 and 2 is thought to be due to the ratio ($W_{Pt1}/W_{Pd1}$) of the weight of platinum ($W_{Pt1}$) to the weight of palladium ($W_{Pd1}$) in the first catalyst coating layer not being appropriate for HC purification. Namely, in the catalyst devices of Comparative Examples 1 and 2, since HC present in exhaust gas that flowed into the catalyst device is maintained at a high HC concentration even after passing the first catalyst coating layer without being sufficiently purified by the first catalyst coating layer, Pd present in the third catalyst coating layer is poisoned by the HC, and this is thought to have impaired the CO purification performance of the third catalyst coating layer.

In contrast, in the catalyst devices of Examples 1 to 3, the ratio ($W_{Pt1}/W_{Pd1}$) of the weight of platinum ($W_{Pt1}$) to the weight of palladium ($W_{Pd1}$) in the first catalyst coating layer is thought to be appropriate for HC purification. Consequently, the concentration of HC in exhaust gas that flows into the catalyst device is sufficiently low after passing the first catalyst coating layer, poisoning of Pd present in the third catalyst coating layer is inhibited, and the third catalyst coating layer is therefore thought to have demonstrated the intended level of CO purification performance.

With reference to Table 6, the catalyst devices of Comparative Example 3, in which the ratio ($W_{Pt2}/W_{Pd2}$) of the weight of platinum ($W_{Pt2}$) to the weight of palladium ($W_{Pd2}$) in the second catalyst coating layer is below the prescribe range of the present invention, and Comparative Example 4, in which the ratio ($W_{Pt2}/W_{Pd2}$) of the weight of platinum ($W_{Pt2}$) to the weight of palladium ($W_{Pd2}$) in the second catalyst coating layer exceeds the prescribed range of the present invention, demonstrated low values for NO$_2$ formation rate. In contrast, the catalyst devices of Examples 1, 4 and 5, in which the ratio ($W_{Pt2}/W_{Pd2}$) between the two parameters in the second catalyst coating layer is within the prescribed range of the present invention, demonstrated high values of 30% or more for NO$_2$ formation rate. If the ratio ($W_{Pt2}/W_{Pd2}$) of the weight of platinum ($W_{Pt2}$) to the weight of palladium ($W_{Pd2}$) in the second catalyst coating layer is within the prescribed range of the present invention, both acceleration of the oxidation reaction by Pt and heat resistance by Pd are realized, and this is thought to have allowed NO$_2$ formation to have proceeded properly by oxidation of NO.

Similarly, the catalyst devices of Comparative. Examples 5 to 7, in which the ratio ($W_{Pt3}/W_{Pd3}$) of the weight of platinum ($W_{Pt3}$) to the weight of palladium ($W_{Pd3}$) in the third catalyst coating layer is outside the prescribed range of the present invention, demonstrated low values for CO purification rate. In contrast, the catalyst devices of Examples 1 to 6, in which the ratio ($W_{Pt3}/W_{Pd3}$) between these two parameters in the third catalyst coating layer is within the prescribed range of the present invention, all demonstrated high values for CO purification rate of 82% or more. The ratio ($W_{Pt3}/W_{Pd3}$) of the weight of platinum ($W_{Pt3}$) to the weight of palladium ($W_{Pd3}$) in the third catalyst coating layer being within the prescribed range of the present invention is understood to mean that the ratio is within the range suitable for oxidation and purification of CO.

According to Table 6, the catalyst devices of Comparative Examples 8 and 9, which only have two catalyst coating layers, did not simultaneously demonstrate high values for HC purification rate, CO purification rate and NO formation rate. This is thought to be due to the inability to accommodate the three reactions of HC oxidation, CO oxidation and NO oxidation with only two catalyst coating layers since the suitable values for the ratio between the weight of platinum to the weight of palladium mutually differ between each reaction.

Examples 7 to 12 and Comparative Examples 10 to 15

Catalyst devices having the catalyst coating layer configurations respectively shown in FIGS. 3(a) to 3(d), FIGS. 4(a) to 4(d) and FIGS. 5(a) to 5(d) were produced and evaluated.

<Production of Catalyst Devices>

Catalyst devices were respectively produced in the same manner as Example 1 with the exception of changing the ratio of the length of each coating layer from the end to the length (d) of the substrate (5) to make the lengths ($L_1$, $L_2$, $L_3$) of the first to third coating layers (1, 2, 3) to be as respectively described in Table 7 by arranging each of the prescribed slurries for forming the catalyst coating layers on the exhaust gas inlet end or exhaust gas outlet end of the substrate (5) when forming the first to third catalyst coating layers followed by adjusting the aspiration air volume when aspirating from the opposite end.

<Evaluation of Catalyst Devices>

The resulting catalyst devices were evaluated in the same manner as Example 1. The evaluation results are respectively shown in Table 7 together with the evaluation results for Example 1.

TABLE 7

Evaluation Results (Effect of Lengths of First to Third Catalyst Coating Layers)

|  | First Catalyst Coating Layer | | | | Second Catalyst Coating Layer | | | | Third Catalyst Coating Layer | | | |
| --- | --- | --- | --- | --- | --- | --- | --- | --- | --- | --- | --- | --- |
|  | Pt (g) | Pd (g) | $W_{Pt1}/W_{Pd1}$ | Length ratio*1) | Pt (g) | Pd (g) | $W_{Pt2}/W_{Pd2}$ | Length ratio*2) | Pt (g) | Pd (g) | $W_{Pt3}/W_{Pd3}$ | Length ratio*2) |
| Ex. 1 | 2.00 | 1.00 | 2.00 | 40% | 1.00 | 0.20 | 5.00 | 80% | 0 | 0.60 | 0 | 80% |
| Comp. Ex. 10 | 2.00 | 1.00 | 2.00 | 5% | 1.00 | 0.20 | 5.00 | 80% | 0 | 0.60 | 0 | 80% |
| Ex. 7 | 2.00 | 1.00 | 2.00 | 10% | 1.00 | 0.20 | 5.00 | 80% | 0 | 0.60 | 0 | 80% |
| Ex. 8 | 2.00 | 1.00 | 2.00 | 50% | 1.00 | 0.20 | 5.00 | 80% | 0 | 0.60 | 0 | 80% |
| Comp. Ex. 11 | 2.00 | 1.00 | 2.00 | 60% | 1.00 | 0.20 | 5.00 | 80% | 0 | 0.60 | 0 | 80% |
| Comp. Ex. 12 | 2.00 | 1.00 | 2.00 | 40% | 1.00 | 0.20 | 5.00 | 40% | 0 | 0.60 | 0 | 80% |
| Ex. 9 | 2.00 | 1.00 | 2.00 | 40% | 1.00 | 0.20 | 5.00 | 50% | 0 | 0.60 | 0 | 80% |
| Ex. 10 | 2.00 | 1.00 | 2.00 | 40% | 1.00 | 0.20 | 5.00 | 90% | 0 | 0.60 | 0 | 80% |
| Comp. Ex. 13 | 2.00 | 1.00 | 2.00 | 40% | 1.00 | 0.20 | 5.00 | 100% | 0 | 0.60 | 0 | 80% |
| Comp. Ex. 14 | 2.00 | 1.00 | 2.00 | 40% | 1.00 | 0.20 | 5.00 | 80% | 0 | 0.60 | 0 | 40% |
| Ex. 11 | 2.00 | 1.00 | 2.00 | 40% | 1.00 | 0.20 | 5.00 | 80% | 0 | 0.60 | 0 | 50% |
| Ex. 12 | 2.00 | 1.00 | 2.00 | 40% | 1.00 | 0.20 | 5.00 | 80% | 0 | 0.60 | 0 | 90% |
| Comp. Ex. 15 | 2.00 | 1.00 | 2.00 | 40% | 1.00 | 0.20 | 5.00 | 80% | 0 | 0.60 | 0 | 100% |

|  | Total Precious Metals*3) | | | HC | $NO_2$ | CO |
| --- | --- | --- | --- | --- | --- | --- |
|  | Pt (g/L) | Pd (g/L) | Total (g/L) | Purification Rate (%) | Generation Rate (%) | PurifiCation Rate (%) |
| Ex. 1 | 1.53 | 0.92 | 2.45 | 83 | 30 | 85 |
| Comp. Ex. 10 | 1.53 | 0.92 | 2.45 | 66 | 26 | 70 |
| Ex. 7 | 1.53 | 0.92 | 2.45 | 81 | 29 | 82 |
| Ex. 8 | 1.53 | 0.92 | 2.45 | 82 | 28 | 83 |
| Comp. Ex. 11 | 1.53 | 0.92 | 2.45 | 64 | 18 | 71 |
| Comp. Ex. 12 | 1.53 | 0.92 | 2.45 | 82 | 15 | 83 |
| Ex. 9 | 1.53 | 0.92 | 2.45 | 84 | 24 | 86 |
| Ex. 10 | 1.53 | 0.92 | 2.45 | 83 | 31 | 85 |
| Comp. Ex. 13 | 1.53 | 0.92 | 2.45 | 84 | 14 | 82 |
| Comp. Ex. 14 | 1.53 | 0.92 | 2.45 | 83 | 29 | 71 |
| Ex. 11 | 1.53 | 0.92 | 2.45 | 83 | 29 | 86 |
| Ex. 12 | 1.53 | 0.92 | 2.45 | 83 | 31 | 83 |
| Comp. Ex. 15 | 1.53 | 0.92 | 2.45 | 83 | 30 | 69 |

*1)Ratio of length of catalyst coating layer from gas inlet end of honeycomb substrate to total length of honeycomb substrate (%)
*2)Ratio of length of catalyst coating layer from gas outlet end of honeycomb substrate to total length of honeycomb substrate (%)
*3)Value obtained by dividing total amount of precious metal supported on first to third catalyst coating layers by substrate volume (1.96 L)

The ratios ($W_{Pt1}/W_{Pd1}$, $W_{Pt2}/W_{Pd2}$, $W_{Pt3}/W_{Pd3}$) in Table 7 respectively refer to the ratio of the weight of platinum ($W_{Pt1}$, $W_{Pt2}$, $W_{Pt3}$) and the ratio of palladium ($W_{Pd1}$, $W_{Pd2}$, $W_{Pd3}$) in the first to third catalyst coating layers.

According to Table 7, Comparative Example 10, in which the length ($L_1$) of the first catalyst coating layer (1) is less than the prescribed range of the present invention, demonstrated low values for HC purification rate and CO purification rate. The HC oxidation reaction is thought to have proceeded insufficiently in Comparative Example 10 since the length ($L_1$) of the first catalyst coating layer (1) was excessively short. Consequently, HC concentration is maintained at a high value even after having passed the first catalyst coating layer, and CO purification performance of the third catalyst coating layer is thought to have been impaired by HC poisoning of the Pd in the third catalyst coating layer.

The catalyst device of Comparative Example 11, in which the length ($L_1$) of the first catalyst coating layer (1) exceeded the prescribed range of the present invention, demonstrated a low value for HC purification rate, and CO purification rate and $NO_2$ formation rate did not demonstrate a high value.

In Comparative Example 11, since the length ($L_1$) of the first catalyst coating layer (1) is excessively long, the platinum and palladium contained in the first catalyst coating layer (1) are present dispersed over an excessive length. Consequently, the concentrations of platinum and palladium in the first catalyst coating layer (1) per unit length are low, the amount of heat generated by oxidation of HC is insufficient, and this is thought to have prevented "ignition" of the first catalyst coating layer (1). Consequently, HC concentration is maintained at a high value even after passing the first catalyst coating layer, and CO purification performance of the third catalyst coating layer is thought to have been impaired by HC poisoning of the Pd in the third catalyst coating layer.

The reason for the low NO formation rate in the catalyst device of Comparative Example 11 is thought to be due to the length ($L_1$) of the upper layer in the form of the first catalyst coating layer being excessively long, thereby resulting in increase in the ratio of the portion of the second catalyst coating layer (2) serving as the lower layer, which in turn inhibited the adsorption of NO at the active sites of the second catalyst coating layer (2).

In contrast, in the catalyst devices of Examples 1, 7 and 8, in which the length ($L_1$) of the first catalyst coating layer (1) is within the prescribed range of the present invention, HC purification rate was 81% or more, $NO_2$ formation rate was 28% or more, and CO purification rate was 82% or more, with high values being demonstrated for all parameters.

$NO_2$ formation rate was low in Comparative Example 12, in which the length ($L_2$) of the second catalyst coating layer (2) was below the prescribe range of the present invention. In Comparative Example 12, since the length ($L_2$) of the second catalyst coating layer (2) is excessively short, the $NO_2$ formation reaction is thought to have not proceeded sufficiently by NO oxidation.

On the other hand, $NO_2$ formation rate was low in the catalyst device of Comparative Example 13 as well, in which the length ($L_2$) of the second catalyst coating layer (2) exceeds the prescribed range of the present invention and the second catalyst coating layer (2) is of the same length as the length (d) of the substrate (5). In the catalyst device of Comparative Example 13, the length ($L_2$) of the second catalyst coating layer (2) is equal to the length (d) of the substrate (5), and the front end thereof is exposed to inflowing exhaust gas. Consequently, HC make direct contact with the front end of the second catalyst coating layer (2) while still at a high concentration prior to being purified, and this is thought to have resulted in poisoning of Pd by HC, thereby causing NO oxidation performance of the second catalyst coating layer (2) to be impaired.

In contrast, the catalyst devices of Examples 1, 9 and 10, in which the length ($L_2$) of the second catalyst coating layer (2) is within the prescribed range of the present invention, demonstrated high $NO_2$ formation rates of 24% or more.

According to Table 7, CO purification rates were low in the catalyst devices of Comparative Example 14, in which the length ($L_3$) of the third catalyst coating layer (3) is shorter than the length (d) of the substrate (5), and Comparative Example 15, in which the length ($L_3$) of the third catalyst layer (3) exceeds the prescribed range of the present invention and is equal to the length (d) of the substrate (5).

CO purification rate is thought to be low in Comparative Example 14, in which the length ($L_3$) of the third catalyst coating layer (3) is excessively short, due to the CO oxidation reaction not proceeding sufficiently.

In the catalyst device of Comparative Example 15, the length ($L_3$) of the third catalyst coating layer (3) is equal to the length (d) of the substrate (5), and the front end thereof is exposed to inflowing exhaust gas. Consequently, HC make direct contact with the front end of the third catalyst coating layer (3) while still at a high concentration prior to being purified, and this is thought to have resulted in poisoning of Pd preset in the third catalyst coating layer (3) by HC in the inflowing exhaust gas, thereby causing CO purification performance of the third catalyst coating layer (3) to be impaired. In contrast, the catalyst devices of Examples 1, 11 and 12, in which the length ($L_3$) of the third catalyst coating layer (3) is within the prescribed range of the present invention, demonstrated high CO purification rates of 83% or more.

As has been explained above, the oxidation catalyst device for exhaust gas purification of the present invention has a first catalyst coating layer on the upstream side of exhaust gas flow, a second catalyst coating layer of an upper layer on the downstream side of exhaust gas flow, and a third catalyst coating layer of a lower layer on the downstream side of exhaust gas flow, and the lengths and ratios between the weight of platinum and the weight of palladium in each of these first to third catalyst coating layers are adjusted to within optimum ranges. Consequently, the catalyst device of the present invention is able to carry out $NO_2$ formation and CO purification by HC oxidation and NO oxidation with high efficiency, and is extremely suitable for use as, for example, a DOC in a catalyst system for purifying exhaust gas emitted from a diesel engine.

REFERENCE SIGNS LIST

1 First catalyst coating layer
2 Second catalyst coating layer
3 Third catalyst coating layer
5 Substrate
d Length of substrate
$L_1$ Length of first catalyst coating layer
$L_2$ Length of second catalyst coating layer
$L_3$ Length of third catalyst coating layer

The invention claimed is:
1. An oxidation catalyst device for exhaust gas purification having a substrate and first to third catalyst coating layers on the substrate; wherein, the first catalyst coating layer is present on the upstream side of exhaust gas flow, the second catalyst coating layer is present in an upper layer on the downstream side of exhaust gas flow, and the third catalyst coating layer is present in a lower layer on the downstream side of exhaust gas flow, the first catalyst coating layer contains platinum and palladium, and the ratio $W_{Pt1}/W_{Pd1}$ of the weight of the platinum $W_{Pt1}$ to the weight of the palladium $W_{Pd1}$ is 0.75 to 4.50, the second catalyst coating layer contains platinum and palladium, and the ratio $W_{Pt2}/W_{Pd2}$ of the weight of the platinum $W_{Pt2}$ to the weight of the palladium $W_{Pd2}$ is greater than 4.50 to 25.0, the third catalyst coating layer at least contains palladium, and the ratio $W_{Pt3}/W_{Pd3}$ of the weight of the platinum $W_{Pt3}$ to the weight of the palladium $W_{Pd3}$ is 0.12 or less, the length of the first catalyst coating layer is 8% to 55% of the length of the substrate, the length of the second catalyst coating layer is 45% to 95% the length of the substrate, and the length of the third catalyst coating layer is 45% to 95% of the length of the substrate.

2. The oxidation catalyst device for exhaust gas purification according to claim 1, wherein the substrate is covered by at least one of the first to third catalyst coating layers over the entire length thereof.

3. The oxidation catalyst device for exhaust gas purification according to claim 1, having a layered region in which the first catalyst coating layer and at least one of the second catalyst coating layer and the third catalyst coating layer are layered, and the first catalyst coating layer is the upper layer in the layered region.

4. The oxidation catalyst device for exhaust gas purification according to claim 1, wherein the length of the first catalyst coating layer is 10% to 50% of the length of the substrate, the length of the second catalyst coating layer is 50% to 90% of the length of the substrate, and the length of the third catalyst coating is 50% to 90% of the length of the substrate.

5. The oxidation catalyst device for exhaust gas purification according to claim 1, wherein the ratio $W_{Pt1}/W_{Pd1}$ of the weight of the platinum $W_{Pt1}$ to the weight of palladium $W_{Pd1}$ in the first catalyst coating layer is 1.00 to 4.00, the ratio $W_{Pt2}/W_{Pd2}$ of the weight of the platinum $W_{Pt2}$ to the weight of palladium $W_{Pd2}$ in the second catalyst coating layer is 5.00 to 20.0, and the ratio $W_{Pt3}/W_{Pd3}$ of the weight of the platinum $W_{Pt3}$ to the weight of palladium $W_{Pd3}$ in the third catalyst coating layer is 0.10 or less.

6. The oxidation catalyst device for exhaust gas purification according to claim 1, wherein the total of the weight of the platinum and the weight of the palladium in the first catalyst coating layer is greater than the total of the weight of the platinum and the weight of the palladium in the second catalyst coating layer and the third catalyst coating layer.

7. The oxidation catalyst device for exhaust gas purification according to claim 1, wherein the platinum and palladium in the first to third catalyst coating layers are supported on particles of one or more types of oxides selected from oxides of Al, Si, Ce and Zr.

8. The oxidation catalyst device for exhaust gas purification according to claim 1, wherein the first to third catalyst coating layers contain particles of one or more types of oxides selected from Al, Si, Ce and Zr oxides on which platinum and palladium are not supported.

9. A catalyst system for exhaust gas purification, comprising the oxidation catalyst device for exhaust gas purification according to claim 1, and a selective catalytic reduction device for exhaust gas purification on the downstream side of exhaust gas flow thereof.

* * * * *